United States Patent [19]

Morita

[11] Patent Number: 5,032,751

[45] Date of Patent: Jul. 16, 1991

[54] MAGNETIC FLUID BEARING

[75] Inventor: Kunihiko Morita, Koganei, Japan

[73] Assignee: Nippon Thompson Co., Ltd., Japan

[21] Appl. No.: 540,701

[22] Filed: Jun. 20, 1990

[30] Foreign Application Priority Data

Jun. 23, 1989 [JP] Japan ................ 1-161764

[51] Int. Cl.⁵ .............. F16C 33/74; F16C 17/10; F16C 39/06; F16C 32/06
[52] U.S. Cl. .................... 310/90.5; 384/133
[58] Field of Search ............. 310/90, 90.5; 384/115, 384/133

[56] References Cited

U.S. PATENT DOCUMENTS

| | | | |
|---|---|---|---|
| 4,526,484 | 7/1985 | Stahl et al. | 384/133 |
| 4,645,960 | 2/1987 | Hoffman | 310/90.5 |
| 4,692,699 | 9/1987 | Brunet et al. | 310/90.5 |
| 4,938,611 | 7/1990 | Nil et al. | 384/133 |
| 4,983,869 | 1/1991 | Vaidya et al. | 310/90.5 |

FOREIGN PATENT DOCUMENTS

| | | | |
|---|---|---|---|
| 311122 | 4/1989 | European Pat. Off. | 310/90.5 |
| 127513 | 6/1987 | Japan | 310/90.5 |
| 202526 | 12/1987 | Japan | 310/90.5 |
| 935657 | 6/1982 | U.S.S.R. | 310/90.5 |

OTHER PUBLICATIONS

"Junkatu Handbook", 1970, pp. 596, 597.

Primary Examiner—Steven L. Stephan
Assistant Examiner—D. L. Rebsch
Attorney, Agent, or Firm—Rogers & Killeen

[57] ABSTRACT

A magnetic fluid bearing may include a sleeve provided with a through bore, a shaft inserted into the bore, electromagnets engaged with the bore of the sleeve with a gap provided between the shaft and the electromagnets, a magnetic fluid introduced into the gap between the electromagnets and the shaft, and a controller for modifying the magnetic force of the electromagnets in accordance with changes in a load condition of the bearing. One or more electromagnets for radial loads may be engaged with the sides of the bore and an electromagnet for thrust loads may be engaged with a bottom of the bore. The controller has a sensor to detect changes in an inductance or capacitance that are indicative of the position of the shaft. The controller translates the changes into signals and transmits the signals to a power amplifier to modify the position of the shaft by changing the rate of electric current running through the electromagnets.

9 Claims, 4 Drawing Sheets

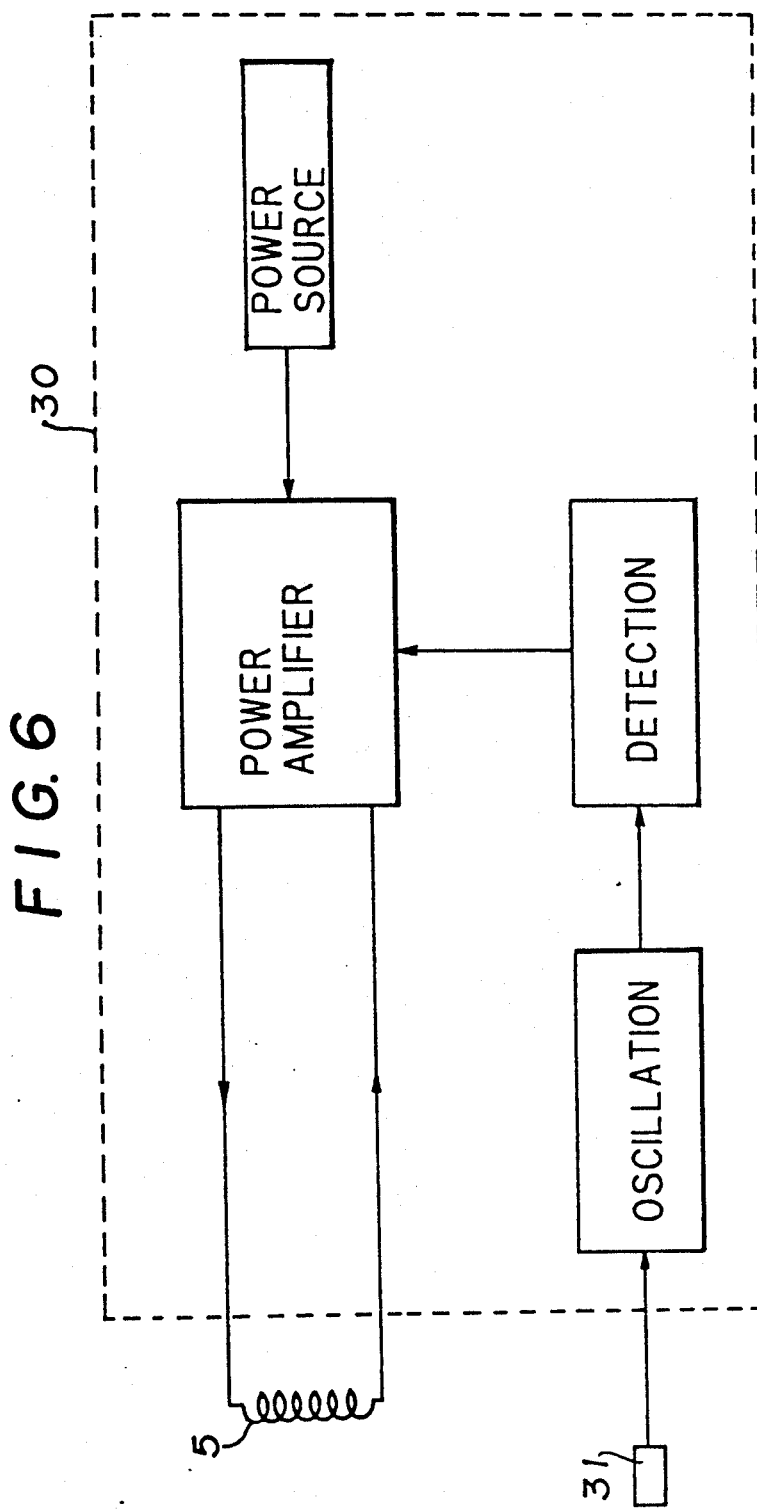

5,032,751

MAGNETIC FLUID BEARING

BACKGROUND OF THE INVENTION

This invention relates to a magnetic fluid bearing and more particularly it relates to a magnetic fluid bearing utilizing a magnetic fluid and an electromagnet.

A magnetic bearing supports a rotary shaft by utilizing the attracting or repulsive force of magnetism of either a permanent magnet or an electromagnet so as to control a position of the center of the shaft.

A magnetic fluid is a colloid of fine particles of a ferromagnetic material in solvent. The fluid is automatically magnetized when an external magnetic field is applied to it. In other words, it can be positionally controlled by means of a magnet.

Japanese Patent Laid-open No. 62-202526 discloses a magnetic bearing utilizing a permanent magnet and a magnetic fluid.

With such an arrangement, a hollow disc-shaped magnet is fitted to a shaft made of a magnetic material and the radial gap between the magnet and the shaft is filled with the magnetic fluid to form a magnetic circuit. By a concentration of the magnetic flux of the magnetic fluid, a liquid 0-ring is formed by the magnetic fluid to seal the gap.

Since a magnetic fluid is used as sealing means and a permanent magnet is used as a magnet, it is necessary to prepare a permanent magnet having a magnetic effect that can meet the load condition of the bearing and formation of a sleeve by using it for each application of a bearing of this type.

Moreover, the manufacturer of such a known magnetic fluid bearing is required to fabricate and store a wide variety of permanent magnets in large quantity to meet the above requirements, entailing a large and complicated manufacturing line and an enhanced cost for management of such a manufacturing line and a large inventory.

SUMMARY OF THE INVENTION

The principal object of the present invention is to provide a magnetic fluid bearing that can optimally meet the load condition of the bearing by means of a magnetic fluid and an electromagnet.

According to the invention, there is provided a magnetic fluid bearing comprising: a sleeve provided with a through bore: a shaft inserted into said bore: electromagnets engaged with the bore of the sleeve with a gap provided between said shaft and the electromagnets: and a magnetic fluid introduced into the gap between the electromagnets and the shaft, wherein it further comprises devices for modifying the magnetic force of the electromagnets in accordance with changes in a load condition of the bearing.

A magnetic fluid bearing according to the invention can appropriately accommodate any load condition by accurately controlling the magnetic force of the electromagnet so as to control the rate of rotation of the shaft. The magnetic fluid bearing according to the invention uses its magnetic fluid as lubricant with excellent lubricating and cooling effects. Thus, the bearing can be of high precision and long durability. Such a magnetic fluid bearing can be dimensionally compact and hence of low cost because of the sealing and lubricating effects of the magnetic fluid. Additionally, since the magnetic fluid between the shaft and the electromagnet acts as a buffer, it can effectively reduce the vibration of the bearing.

Now, the present invention will be described in greater detail by referring to the accompanying drawings that illustrate a preferred embodiment of the invention.

BRIEF DESCRIPTION OF THE DRAWINGS

FIG. 6 is a diagram showing a function of a magnetic force controller of the embodiment.

PREFERRED EMBODIMENT OF OF THE INVENTION

Figure 2:
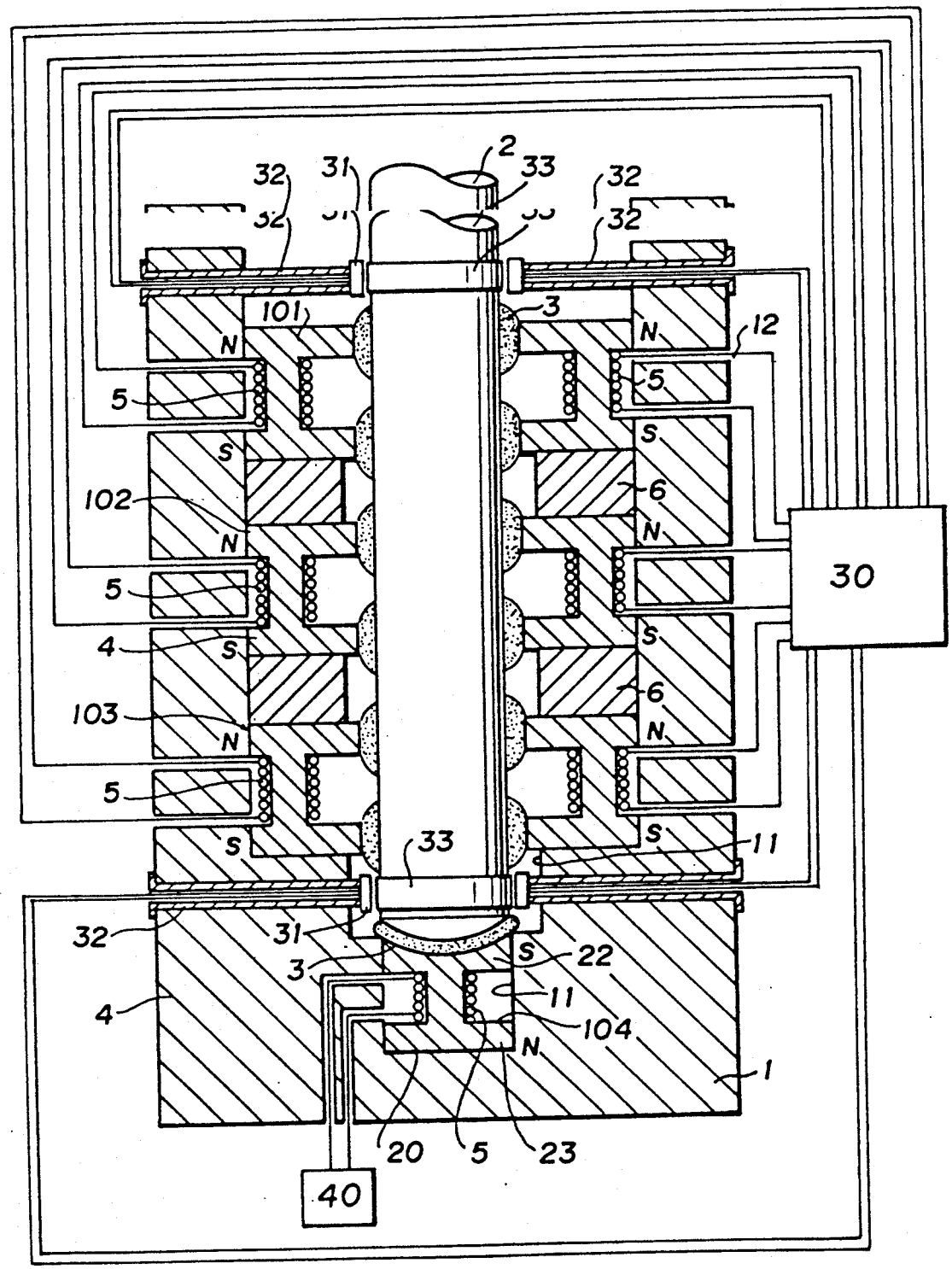
FIG. 2 is an axial sectional view of the bearing of FIG. 1.

In the preferred embodiment of the invention, a bearing comprises a bearing main body and magnetic force controllers 30, 40. The bearing main body includes a sleeve 1, electromagnets for radial loads 10, an electromagnet for thrust loads 20, a shaft 2 and a sensor 31 electrically connected with the magnetic force controllers 30, 40 for aligning the shaft.

The sleeve 1 has a bore 11 in which the shaft 2, the electromagnets for radial loads 10 and the electromagnet for thrust loads 20 are arranged. The sleeve 1 also has holes for housing wires which electrically connects the electromagnets 10, 20 and the magnetic force controllers 30, 40. Said sleeve 1 is made of a nonmagnetic material such as ceramic, resin or nonmagnetic metal (austenitic stainless steel, aluminum alloy, etc.).

One or more electromagnets 10 are rigidly fitted to the bore 11 of the sleeve 1. In the illustrated embodiment, three electromagnets 101, 102, 103 are arranged in the bore 11, but the number of member electromagnets for radial loads is not limited thereto.

Figure 3:
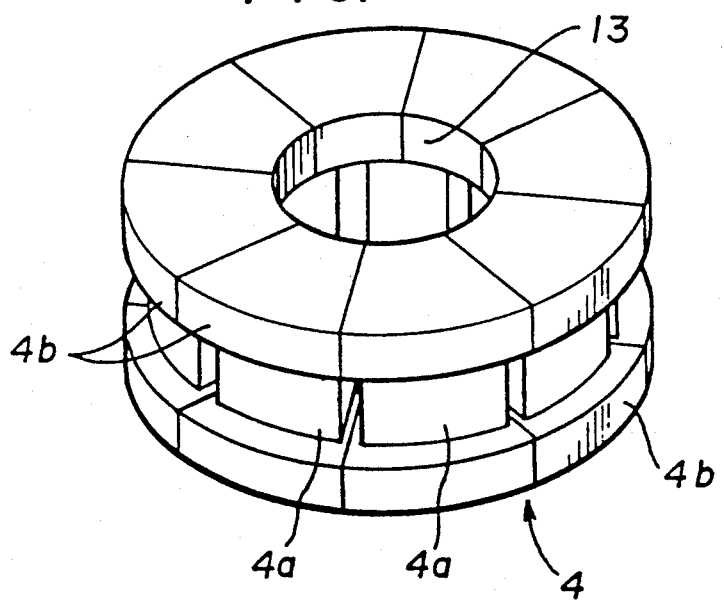
FIG. 3 shows a perspective view of the core assembly of the electromagnet for radial loads.

The electromagnet 10 comprises cores 4 circularly arranged to form a core assembly and wires around each core 4 of the core assembly to form a coil 5. Although in this preferred embodiment each core assembly of the electromagnet 10 comprises eight cores 4 as illustrated in FIG. 3, the number of cores for forming one core assembly is not limited thereto. The electromagnet 10 is hollow at its axial center and provided with an insertion hole 13 in which the shaft 2 is inserted. An outer diameter of the electromagnet 10 which are defined by the assembled cores 4 is identical with the inner diameter of the bore 11 so that the electromagnet 10 can be engagedly arranged within the bore 11 of the sleeve 1.

Figure 4:
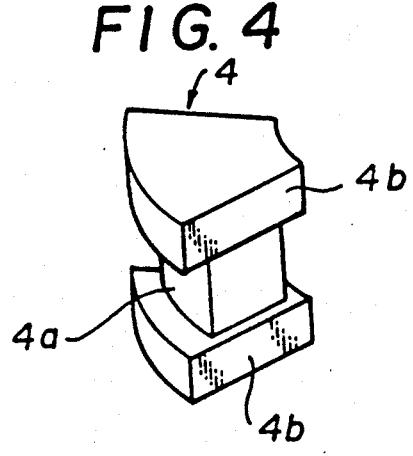
FIG. 4 is a perspective view of one of the cores of FIG. 3.

As seen from FIG. 4, the core 4 comprises a central coil receiving section 4a and a pair of projecting sections 4b formed at its both axial ends so that a large number of wires can be held between the projecting sections 4b or at the central coil receiving section 4a. Each core 4 has a sector-shaped lateral cross sectional view and a H-shaped axial cross sectional view so that it can effectively generate a magnetic flux and accommodate a large number of windings of the coil 5.

The electromagnet for thrust loads 20 is engagedly fitted to a bottom of the bore 11 of the sleeve 1.

Figure 5:
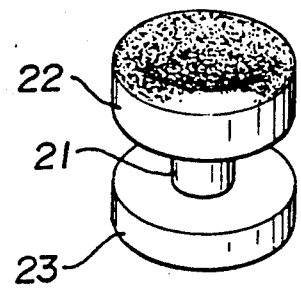
FIG. 5 is a perspective view o f the core of the electromagnet for thrust loads of the embodiment.
Figure 1:
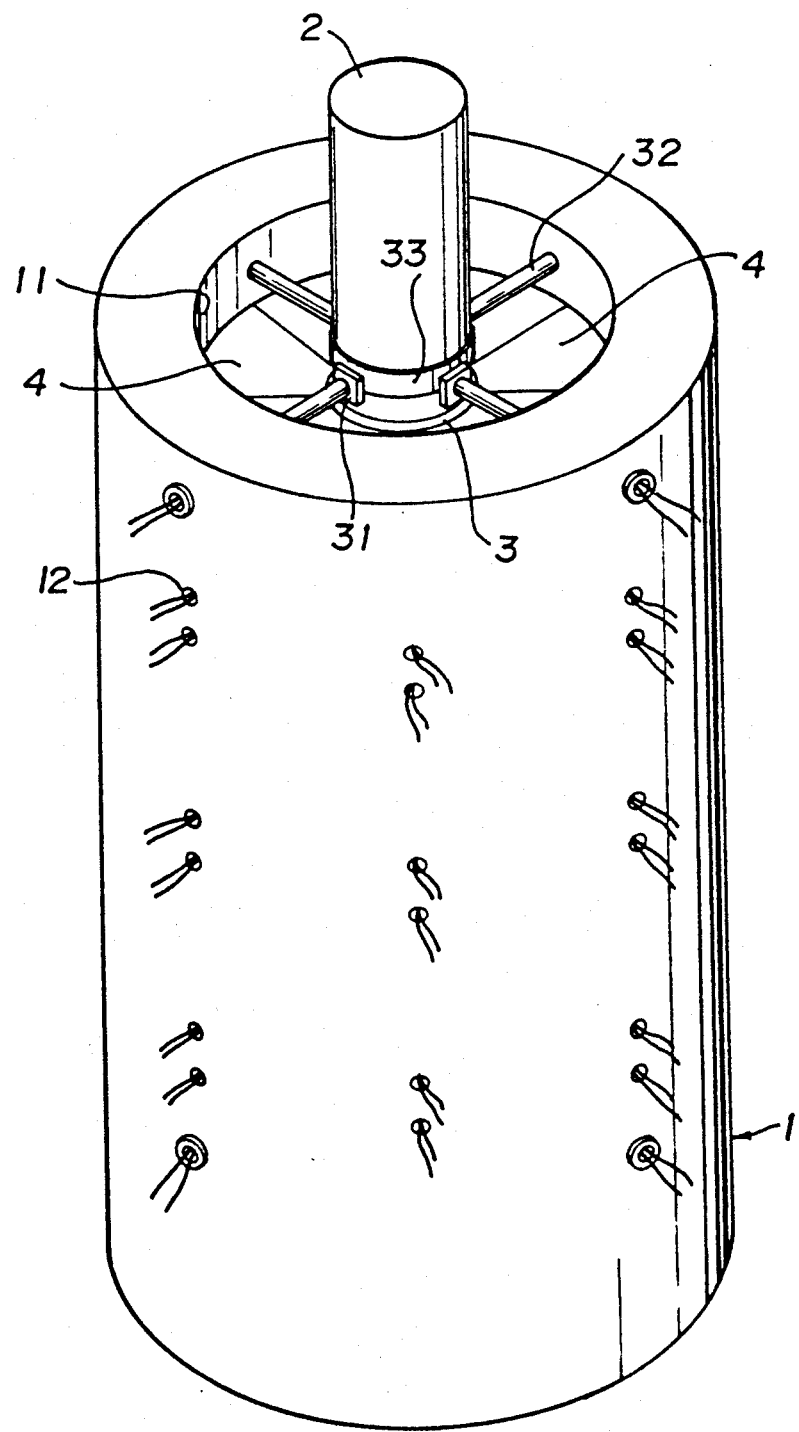
FIG. 1 is a perspective view of the magnetic fluid bearing according to the invention.

As illustrated in FIG. 5, the electromagnet for thrust loads 20 comprises a central section 21 for receiving a coil 5, a projecting section 22 which faced to a lower end of the shaft 2 and a bottom section 23 faced to the bottom of the bore 11 of the sleeve 1. As seen from FIG. 2, an outer surface of the projecting section 22 is a concave. A radius of curvature of the concave is identical with that of the surface of convex lower end of the shaft 2.

When the coils 5 are energized by electricity, each of the cores 4 is magnetized. One of the projecting sections 4b becomes the N-pole while the other becomes the S-pole of the electromagnet and one of the projecting section 22 and the bottom section 23 is magnetized and becomes the N-pole, while the other becomes the S-pole of the electromagnet. When the coils 5 are deenergized, each of the cores remains magnetized so that the projecting sections 4b and 22 function as magnetic poles.

The coils 5 of the electromagnet 10 for radial loads 20 are connected with the magnetic force controller 30 through holes 12 arranged on the sleeve 1. More than one electromagnets 101, 102 and 103 of the electromagnet 10 are commonly connected with single magnetic force controller 30. The coil 5 of the electromagnet 20 is connected with the magnetic force controller 40. Since the load condition in the sense of thrust is different from the radial load condition, separate controllers are needed to control the magnetic force in the sense of thrust and the radial magnetic force. However, the magnetic force controller 40 for the electromagnet for thrust loads 20 can have a construction same as that of the magnetic force controller 30 for the electromagnet for radial loads 20.

The magnetic force controller modifies an electric current or voltage applied to the coil 5 in response to change in the load condition of the bearing so as to vary the magnetic force of the electromagnet. It is preferable to modify the electric current because of ease of operation.

The shaft 2 is inserted into the bore 11 of the sleeve 1. More specifically, the shaft 2 is introduced into the insertion hole 13 of said electromagnet 10. Said shaft 2 is made of a nonmagnetic material such as ceramic, resin or nonmagnetic metal (austenitic stainless steel, aluminum alloy, etc.). A diameter of the shaft 2 is smaller than a diameter of the insertion hole 12 so as to form a radial gap between the shaft 2 and the electromagnet 10. Magnetic rings 33 are provided around the shaft 2 in response to the positions of the sensors 31. The magnetic ring 33 is made of magnetic material and is very thin.

The radial gap between the shaft 2 and the electromagnet 10 is filled with a magnetic fluid. The magnetic fluid is a liquid in which very fine magnetic particles coated with a surface-active agent is stably suspended in a solvent or a dispersion medium. Any known dispersion medium, dispersive particles and surface active agent can be used for the purpose of the invention. The dispersion medium preferably includes water, kerosene, mineral oil and synthetic oil. The dispersive particles preferably includes various ferrites such as magnetites, Mn—Zn ferrite, etc., magnetic metals such as iron, cobalt, nickel, etc. A diameter of the dispersive fine particles is preferably in the order of one hundredth of a micron (0.01 to 0.099). The surface-active agent preferably includes an unsaturated aliphatic acid having a long carbon chain and a similar material. As described above, the magnetic fluid is automatically magnetized when an external magnetic field is applied to it. In other words, it can be positionally controlled by means of a magnet.

Since one of the projecting sections 4b and one of the projecting section 22 and the bottom section 23 become the N-poles while the others become the S-poles of the electromagnets, the magnetic flux of each of the cores 4 is intensified at or around the projecting sections 4b and 22. Therefore, the magnetic fluid is predominantly found at or near the projecting sections 4b and 22 as illustrated in FIG. 2.

A hollow disc-shaped nonmagnetic member 6 is tightly fitted between two adjacent electromagnets. Said nonmagnetic members 6 eliminates any possible mutual interference of the electromagnets 10 so that they can function as so many independent magnets. The nonmagnetic members 6 are preferably made of ceramic, resin or nonmagnetic metal (austenitic stainless steel, aluminum alloy, etc.). A diameter of the nonmagnetic member 6 is identical with that of the bore 11. Thus, the nonmagnetic member 6 can be engagedly fitted into the bore 11 of the sleeve 1. An axial length of the nonmagnetic member 6 is determined in a known manner based on the magnetic force of the electromagnets.

The magnetic force controllers may be of any known type. FIG. 6 illustrates a magnetic force controller for controlling the electric current that runs through the coils 5. It should be noted that the magnetic force controllers to be used for a magnetic fluid bearing according to the invention are not limited thereto and those of a different configuration may be appropriately used.

The sleeve 1 is provided with sensors 31 by means of sensor-supporting means 32. In the illustrated embodiment, four sensors are provided equidistantly at an upper end portion of the sleeve and four sensors also provided equidistantly between the electromagnet for radial loads 103 and electromagnet for thrust loads 104. The sensors 31 are connected to the magnetic controller 30 respectively. The sensors 31 detect changes in the position of the shaft 2 as changes in an inductance or capacitance of the electromagnets. More specifically, the sensors 31 detect the changes in the magnetic force between the sensors 31 and the magnetic rings 33 as changes in the inductance or capacitance of the electromagnets.

As illustrated in FIG. 6, the changes in the inductance or capacitance are translated into signals, which are then taken out, oscillated, detected and then transmitted to a power amplifier to modify the electric current supplied to the coil, in order to modify the position of the shaft 2 by controlling the current running through the coils 5, so as to control the magnetic force of the electromagnets.

The magnetic fluid bearing according to the invention is prepared as described below. A wire is wound to each of the cores 4 to form a coil 5. The eight cores 4 with wires are then assembled to form the hollow cylindrical core assembly or the electromagnet for radial loads 10. Also the electromagnet for thrust loads 20 or 104 is formed by winding a wire around the central section 21 of the core to form a coil 5. The sensor supporting means 32 with the sensors 31 are fixedly attached to the sleeve 1. The sensor 31 is connected to the magnetic controller 30. The electromagnet for thrust loads 104 is introduced into and engaged with the bore 11 of the sleeve 1. Similarly, the electromagnets 101, 102, 103 and the nonmagnetic member 6 are inserted into and engaged with the bore 11 of the sleeve 1. Thereafter, the wires of the coils 5 are electrically connected to the magnetic force controllers. Then the shaft 2 with the magnetic ring 33 is introduced in the insertion hole 13 of the electromagnet 10. The magnetic fluid 3 is poured into the gap between the shaft 2 and the electromagnet 10. When the coils 5 are electrically energized, the electromagnet 10 is magnetized and the magnetic fluid 3 is attracted toward the projecting sections 4b, 22 as illustrated in FIG. 2. It should be noted that, if the electromagnet 10 is deenergized, the magnetic fluid 3 is held to the positions of FIG. 2 due to the remaining magnetic force of the cores and hence the shaft 2 is stably sustained.

While the above embodiment comprises only a magnetic fluid bearing according to the invention, a combination of a conventional bearing (such as a ball and roller bearing) and a magnetic fluid bearing according to the invention may be realized by those skilled in the art.

What is claimed is:

1. A magnetic fluid bearing comprising:
    a sleeve provided with a through bore;
    a shaft inserted into said bore;
    electromagnets engaged with the bore of the sleeve with a gap provided between said shaft and the electromagnets;
    a magnetic fluid introduced into the gap between the electromagnets and the shaft; and
    means for modifying the magnetic force of the electromagnets in accordance with changes in a load condition of the bearing to control the position of the portion of the shaft within the sleeve.

2. The magnetic fluid bearing according to claim 1, wherein one or more electromagnets for radial loads are engaged with the bore and an electromagnet for thrust loads is engaged with an end of the bore.

3. The magnetic fluid bearing according to claim 2, wherein said electromagnet for radial loads comprises a plurality of cores and coils.

4. The magnetic fluid bearing according to claim 1, wherein the means for modifying the magnetic force of the electromagnets detect changes in a position of the shaft as changes in an inductance or capacitance by means of a sensor, translate the changes into signals, oscillate and detect the signals and transmit the signals to a power amplifier to modify the position of the shaft by changing the rate of electric current so as to appropriately control a current running through the electromagnets.

5. In a fluid bearing comprising a sleeve provided with a bore, a shaft inserted into the bore and plural electromagnets carried within the bore, a gap being provided between the shaft and the electromagnets, the improvement comprising:
    magnetic fluid responsive to the electromagnets introduced into the gap; and
    means to selectively vary the magnetic force applied by said electromagnets to said magnetic fluid so as to position the shaft within said gap.

6. The bearing of claim 5 wherein said shaft is substantially non-magnetic.

7. The bearing of claim 6 further comprising sensor means to determine the position of the shaft within the bore.

8. The bearing of claim 7 wherein said sensor means senses changes in one of inductance and capacitance.

9. A method for controlling the position of a rotating shaft within a sleeve, comprising the steps of:
    (a) mounting plural electromagnets about the interior of the sleeve;
    (b) substantially filling the gap between the electromagnets and the shaft with magnetic fluid; and
    (c) controlling the electromagetic force induced on the magnetic fluid by the electromagnets responsively to the position of the shaft within the sleeve.

* * * * *